Figure 1:
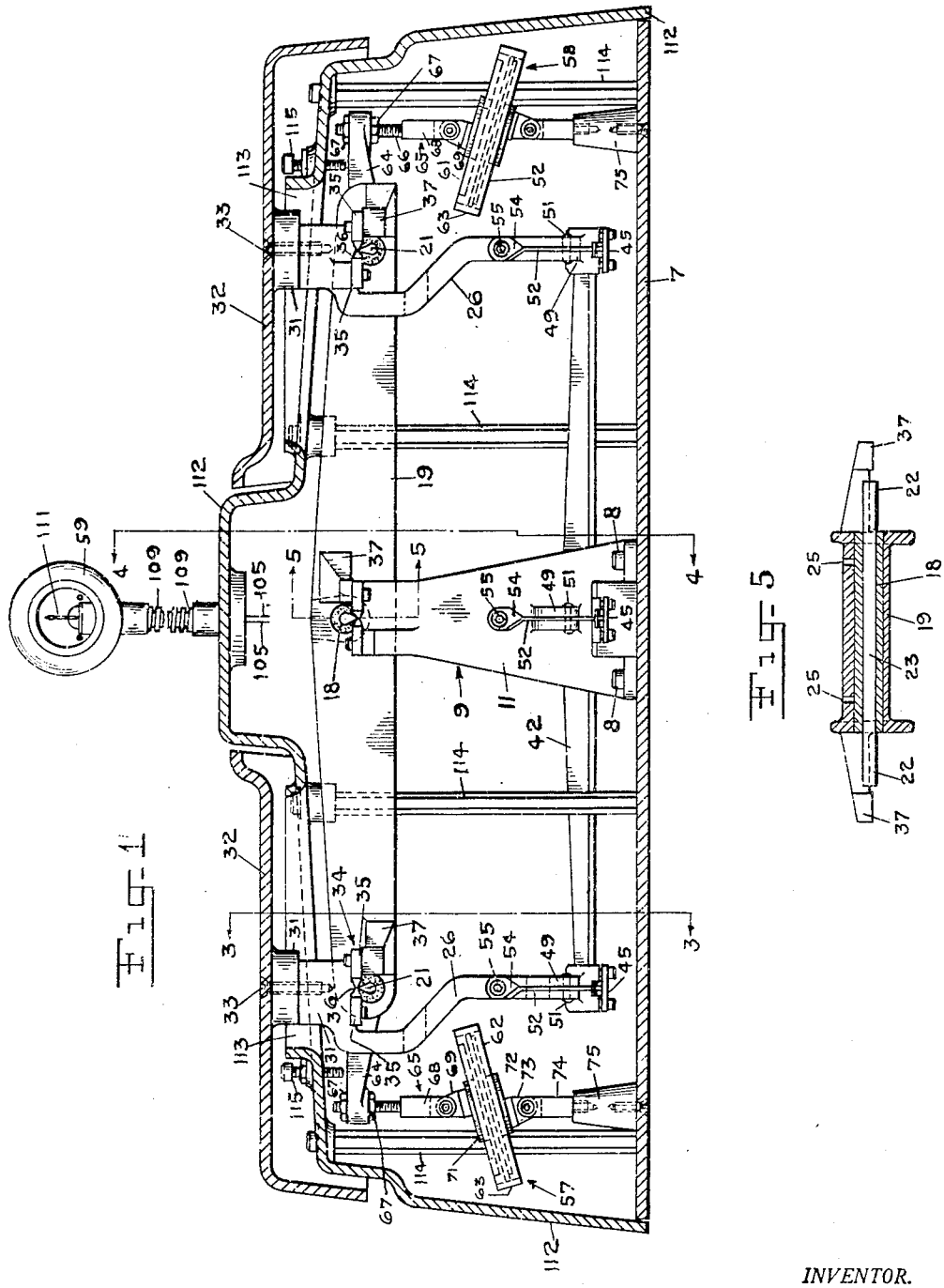

Nov. 20, 1956  H. A. HADLEY  2,771,289
WEIGHING SCALES

Filed Nov. 12, 1949  3 Sheets-Sheet 2

INVENTOR.
HARLAN A. HADLEY.
BY Henry Sherman
Attorney

INVENTOR.
HARLAN A. HADLEY

United States Patent Office 2,771,289
Patented Nov. 20, 1956

2,771,289

WEIGHING SCALES

Harlan A. Hadley, Burlington, Vt., assignor to Metrogram Corporation of America, Winooski, Vt., a corporation of Vermont Application November 12, 1949, Serial No. 126,809

5 Claims. (Cl. 265—54)

My invention relates to weighing scales, and relates more particularly to weighing scales of the equal-arm balance, over-and-under type wherein over-weight and under-weight are determined and indicated by electrical means. The equal-arm balance scales with which my invention is concerned have a centrally fulcrumed lever having two arms of equal length, at the ends of which arms are pivotally supported the load receiving platform and the counterbalancing weight receiving platform. The equal-arm balance scales of my invention have such sensitivity that they may be employed for weighing minute quantities as well as substantially large quantities.

The primary object of my invention is to improve generally the construction of equal-arm balance, over-and-under weighing scales.

A more specific object of my invention is the provision of a novel means for indicating the weight of objects or commodities electrically.

Another object of my invention is to provide a novel electrical arrangement which is electrically connected to the lever of an equal-arm balance scale and which permits free movement of said lever. In its broadest aspect, the electrical arrangement embodies two capacitors, one of which is operatively connected to the lever at the end of one arm thereof and the other at the end of its other arm, the construction and disposition of said capacitors being such the capacitance thereof may be varied by the movement of said lever.

Still another object of my invention is to provide a capacitor construction and arrangement whereby it will function in operation as a means for dampening the oscillation of the lever.

A further object of my invention is to provide in the electrical arrangement of the equal-arm balance scale of my invention a microammeter for giving the over-weight, under-weight or zero indications.

Another object of my invention is the provision of a novel flexible means for supporting said microammeter indicator.

Yet another object of my invention is to provide a novel check link construction wherein there is employed a plurality of tensioned metallic ribbons to which the check link is operatively connected.

Another object of my invention is the provision of a lever wherein the knife edges of the fulcrum pivot and the load pivots are in substantially the same horizontal plane.

Still another object of my invention is to provide a novel method for mounting the knife edge pivots in the lever of the scale.

Another object of my invention is the provision of a novel arrangement for mounting the flat agates which act as bearing surfaces for the knife edge pivots.

Other objects and advantages of my invention, together with certain details of construction and combinations of parts, will appear in the following description and will be pointed out in the appended claims.

Figure 2:
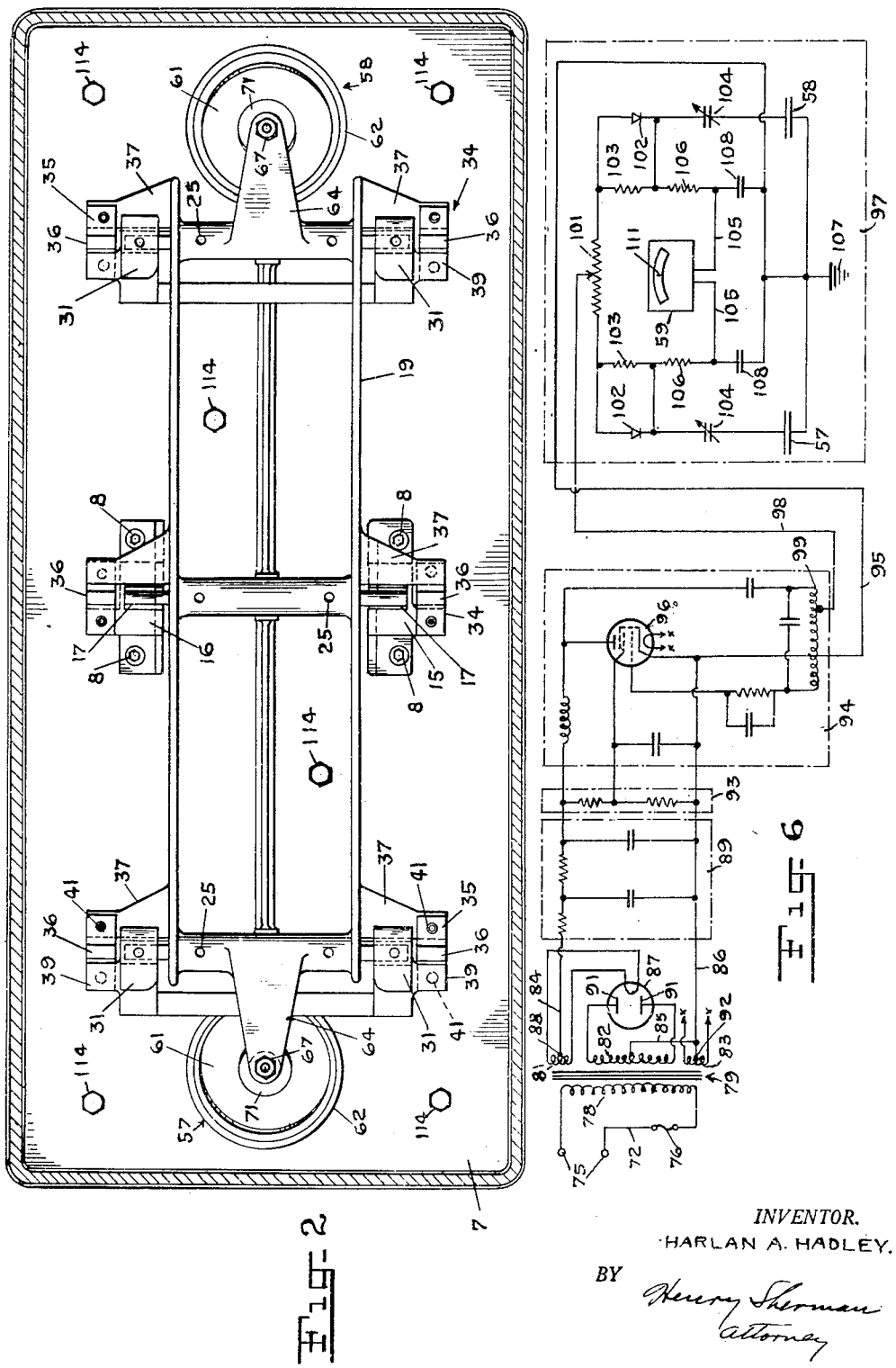
Figure 3:
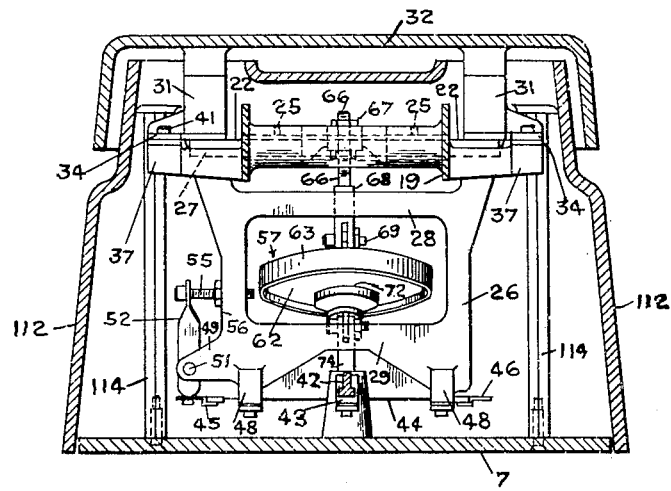
Figure 4:
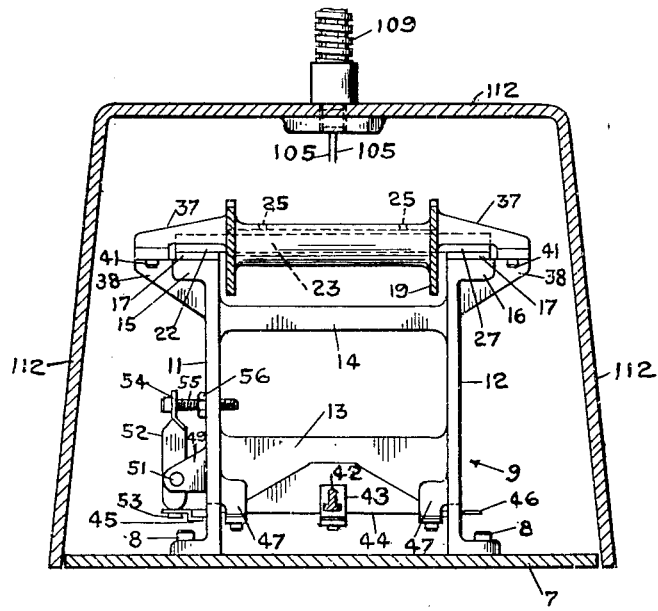

In the drawings wherein a preferred embodiment of my invention is shown,

Fig. 1 is a front elevational view of the equal-arm balance scale of my invention with the housing elements shown in vertical cross-section, Fig. 2 is a top plan view of the lever arrangement of my equal-arm balance scale with the supporting posts and one of the housing elements shown in horizontal cross-section, Fig. 3 is a cross-sectional view taken along line 3—3 in Fig. 1 in the direction of the arrows, Fig. 4 is a cross-sectional view taken along line 4—4 in Fig. 1 in the direction of the arrows, Fig. 5 is a cross-sectional view taken along line 5—5 in Fig. 1 in the direction of the arrows, and Fig. 6 is a circuit diagram of the electrical components embodied in the even-balance scale of my invention.

Like reference numerals indicate like parts throughout the several views of the drawings.

Referring now to the drawings for a detailed description of my invention, the reference numeral 7 indicates a base plate on which the scale elements are mounted and which forms a portion of the housing enclosing the scale elements. Suitably affixed to the base plate 7, as by bolts 8, is a fulcrum stand 9. The fulcrum stand comprises two vertical standards 11 and 12 connected by integral cross-pieces 13 and 14. The upper extremities of each standard 11 and 12 are provided with integral lateral projections 15 and 16, respectively, the upper surfaces of which may be machined to the same flat horizontal plane or each of the bosses may be provided with a recess, the seats of which are machined to the same flat horizontal plane. In either case, an agate 17, which has been ground optically flat on its operative surface, is cemented to the bosses 15 and 16 to form bearing members for a knife edge fulcrum pivot, generally indicated by reference numeral 18 and which will be described more fully hereinafter, mounted securely in equal-armed lever 19. A pair of load pivots 21 are also mounted in lever 19.

Heretofore, the alignment of a plurality of knife edge pivots with the exactness required in accurate weighing scale construction was extremely difficult. In accordance with my invention, I avoid any difficulty of aligning the knife edge pivots by employing a fulcrum pivot and load pivots which are each provided with knife edges 22 at the ends thereof, the portion 23 between the knife edges being substantially round. The pivots are mounted in the lever 19 in the following manner. The equal-armed lever is fixed in a suitable jig wherein it is held in a horizontal plane. The pivots are then inserted in suitable passageways in lever 19. The pivots are so mounted in the jig that the portions 23 thereof are spaced from the inner walls of the passageways. After the pivots are suitably positioned and firmly held in the position wherein all the knife edges are aligned, molten type metal or any other suitable material, such as resins, for example, is poured through openings 25, provided in the lever. When the type metal, or other cementing material, cools and sets, the pivots are rigidly fixed in the lever and the knife edges are permanently aligned. By the above procedure, the difficulty and expense of aligning a plurality of knife edges in a lever are substantially eliminated.

Carried by the knife edges 22 of load pivots 21 are stirrups 26 which are recessed at 27, for the reception of flat agate bearing members. The stirrups 26 are formed with integral cross-pieces 28 and 29 and with vertical extending arms 31 which are adapted to support platforms 32, the latter being retained on said arms 31 by screwbolts 33.

Since the bearing surfaces cooperating with the fulcrum pivot and the load pivots comprise flat surfaces, means is provided to prevent the shifting of the knife edges of said pivots relative to said bearing surfaces. The means herein employed for preventing the shifting of the knife edges is shown in my co-pending application Serial No. 80,025, filed March 7, 1949, now Patent No. 2,611,611, and comprises a flexure member 34 for each pivot. The flexure member comprises a pair of blocks 35 having fixed between them a resilient web 36 which may be made of rubber or other elastomer. In the interest of greater sensitivity, the rubber web may be cut away substantially centrally thereof in such a manner that the smallest cross-section of the web is in line with the knife edge of the pivot and bearing assembly. To maintain the flexure members 34 in position with respect to the pivot and bearing assembly, the lever 19 is provided with a plurality of arms 37, one adjacent each pivot position. Shoulders 38 are provided on standards 11 and 12, and shoulders 39 are provided on stirrups 26. A flexure member 34 is attached to each pair of cooperating bosses at each pivot position by means of bolts or pins 41. Thus, the flexure members are operatively fixed in the pivot and bearing assemblies in horizontal position with respect thereto, i. e. in a plane co-extensive with the plane of the bearing surfaces. The flexure members are so located relative to the horizontal plane in which the knife edges are located that any horizontal component will produce no moment, either positive or negative. The flexure members also cause the lever and check-link elements to maintain parallelograms even when the load platforms are loaded unequally or when the loads are placed off-center on said platforms.

In weighing scales of the type with which my invention is concerned there is usually provided a check link to maintain the load receiving platforms in the desired position. In accordance with my invention, I have provided a novel check link arrangement. Thus, the check link 42 is attached, by means of clamps 43, to a plurality of metal bands 44 each having clips 45 and 46 at the ends thereof. The metal bands 44 are maintained in flat position by restraining clamps 47 on standards 11 and 12 and restraining clamps 48 on the stirrups 26.

The metal bands 44 are caused to be stretched until they are tuned to the same pitch, whereby the said bands are stressed equally. To this end the standard 11 and each of the stirrups are provided with a bifurcated boss 49 in which is pivotally mounted on a pin 51 a lever 52. The lower end of each lever 52 is provided with a tip 53 which is adapted to fit within an opening provided therefor in clip 45. The upper end 54 of each lever is turned at right angles to the body thereof and is provided with an aperture through which is passed a threaded bolt 55 which is adapted to be received in threaded holes in standard 11 and stirrups 26. The tension on the metal bands 44 is adjusted to the desired degree by moving the bolts 55 and they are held in adjusted position by lock nuts 56. Clips 46 prevent the metal bands from being pulled through their respective restraining clamps.

The electrical means for indicating the balance of the lever comprises two capacitors generally indicated by reference numerals 57 and 58 electrically connected to an indicator or null-reading meter 59 which is a microammeter with a central zero. The capacitors 57 and 58 are similar in construction and are mounted one at each end of lever 19 in a similar manner. Thus, each capacitor comprises two relatively movable plates 61 and 62. The upper plate 61 is flat and is adapted to be received within the lower plate 62 which is provided with a flange 63. This construction of the capacitors causes them to have an additional function, that of acting as dampening members, i. e. air dashpots, which dampen the oscillation of the lever 19.

Each upper plate 61 is attached to an arm 64 integral with lever 19 by an adjustable connection generally indicated by reference numeral 65. The connection comprises a screwthreaded rod 66 which is adjustably carried at the free end of arm 64, being held in adjusted position by lock nuts 67. Fixed to the lower end of rod 66 is a bifurcated boss 68 on which is pivotally mounted a bracket 69 fastened to a disc 71 fixed to plate 61. Each lower plate 62 is also adjustably mounted. Thus, the plate 62 has fixed thereto a disc 72 to which is attached a bracket 73 which is pivotally mounted on a bar 74. A stand 75, held on base plate 7 by means of screw bolts 76, is adapted to receive and hold in vertical position the bar 74. The plates 61 and 62 of the capacitors may be adjusted relative to each other in such a manner that during movement of the lever 19 the plate 61 will move relative to plate 62 in a line substantially normal to the base of plate 62. The construction of said capacitors and their location at points equi-distant from the fulcrum pivot are such that any deflection of the lever due to out of level position or change in atmospheric conditions which might affect the capacitance of the capacitor plates will so affect them as to result in no change in the zero reading.

In Fig. 6 there is shown the electrical connections between capacitors 57 and 58. Normally, most of the electrical elements are housed in metallic containers fixed to base plate 7. These housings and wiring and other electrical connections leading to said housings have been omitted in the interest of clarity. In the present invention, the electrical unit employed is connected at 75 to a power line of alternating current, a fuse 76 being provided in 77 leading from the power source. The primary winding 78 of a transformer 79 is energized by the alternating current supply. The transformer 79 has a plurality of secondary windings 81, 82 and 83 with leads 84, 85 and 86, respectively, connected thereto at such points as to insure proper potentials.

Secondary winding 81 supplies filament power to rectifier tube 87. Lead 84 is connected to center tap 88 of secondary winding 81 and supplies power to a filter circuit generally indicated by reference numeral 89. Secondary winding 82 serves to supply high voltage to the anodes 91 of the rectifier tube 87. Lead 85 is connected to the high voltage secondary winding 82 and to the center tap 92 of secondary winding 83 and to lead 86 which serves as a ground and return lead for the entire circuit.

The filter circuit 89 terminates in a voltage divider, generally indicated by reference numeral 93, which in turn is connected to the plate and screen grid of vacuum tube oscillator circuit generally indicated by reference numeral 94. The low potential lead 95 from the oscillator tube 96 of the oscillator circuit is connected to the measuring and indicating circuit 97. The high potential lead 98 is connected from the tank coil 99 of the oscillator circuit 94 to the zero adjusting potentiometer 101 of the measuring and indicating circuit 97.

The balance circuit proper of the measuring and indicating circuit 97 comprises an alternating current bridge circuit in which two germanium crystals 102 are shunted by resistors 103 which form two legs of said bridge. The other two legs of said bridge are the two capacitor plates 61, which are mounted on and move with lever 19, together with adjustable condensers 104. The function of these latter condensers is to match and align the two capacitors 57 and 58 in their null position as well as to block or isolate the circuit metallically.

The meter leads 105 have resistors 106 connected in series as a protection and their values should be as high as can be used without affecting the sensitivity of the device. The resistors 106 are by-passed to ground at 107 by condensers 108 to keep high frequency out of meter 59.

The meter 59 is supported on a flexible shaft 109 which may be of any desired height. By supporting the meter on such a shaft, it may be lowered by bending the shaft or it may be turned to face any direction merely by twisting the shaft. Thus, the meter reading may be taken from many different positions.

The operation of the electrical arrangement is as follows: When the even-arm lever is in its balanced position, the two sides of the bridge circuit are equal and no current flows through the meter 59 and therefore the pointer remains at zero position. Movement of lever 19 moves the capacitor plates 61 attached thereto, thus varying the spacing between the capacitor plates 61 and 62 and therefore the capacity of each plate 61 in relation to its companion plate 62. Since each plate 61 is attached to a different end of lever 19, one plate 61 moves away from its companion plate 62 to decrease the capacity value, and the other plate moves closer to its companion plate to increase its capacity value. The variations in capacity values caused by the movement of lever 19 unbalances the bridge circuit causing current to flow through meter 59 in proportion to the magnitude of the capacitor plate movement, and in the direction corresponding to the movement of the lever 19.

The scale elements are substantially covered by means of a housing 112 provided with openings 113 through which extend vertical arms 31 on which the platforms 32 are carried. The housing 112 is supported on a plurality of uprights 114 mounted on base plate 7.

A pair of adjustable set screws 115 are mounted on housing 112 and serve as stops to limit the travel of lever 19.

The embodiment of my invention above described in connection with the showing in the drawings is to be regarded as illustrative only since my invention is susceptible to variation, modification and change within the spirit and scope of the appended claims.

I claim:

1. In a weighing scale of the class described, the combination with a load-supporting lever system including an equal-arm lever, of an electrical measuring device for indicating the weight of the load on said lever system, and means, including a capacitor at each end of said equal-arm lever, for electrically connecting said lever system to said measuring device, each of said capacitors comprising a stationary plate and a movable plate, said movable plate cooperating with said stationary plate and being fixed to and movable with said equal-arm lever to vary the capacitance of said capacitors, and one of said plates having an annular flange within which the other of said plates is movable whereby a dampening effect on the lever movement is obtained.

2. In a weighing scale of the class described, the combination with a load-supporting lever system including an equal-arm lever, of an electrical measuring device for indicating the weight of the load and said lever system, and means, including two capacitors each equi-distant from the fulcrum point of said equal-arm lever, for electrically connecting said lever system to said measuring device, each of said capacitors comprising a stationary plate and a movable plate, said movable plate cooperating with said stationary plate and being fixed to and movable with said equal-arm lever to vary the capacitance of said capacitors, and one of said plates having an annular flange within which the other of said plates is movable whereby a dampening effect on said lever system is obtained.

3. In a weighing scale of the class described, the combination with a load-supporting lever system including an equal-arm lever, of an electrical measuring device for indicating the weight of the load and said lever system, and means, including two capacitors each equi-distant from the fulcrum point of said equal-arm lever, for electrically connecting said lever system to said measuring device, each of said capacitors comprising a stationary plate and a movable plate, said movable plate cooperating with said stationary plate and being fixed to and movable with said equal-arm lever to vary the capacitance of said capacitors, one of said plates having an annular flange within which the other of said plates is movable whereby a dampening effect on said lever system is obtained, and means for adjusting one of said plates of each of said capacitors relative to the other of said plates.

4. In a weighing scale of the class described, the combination with a load-supporting lever system including an equal-arm lever, of an electrical measuring device for indicating the weight of the load and said lever system, and means, including a bridge circuit and, connected thereto, two capacitors each equidistant from the fulcrum point of said equal-arm lever, for electrically connecting said lever system to said measuring device, each of said capacitors comprising a stationary plate and a movable plate, said movable plate cooperating with said stationary plate and being fixed to and movable with said equal-arm lever to vary the capacitance of said capacitors, and one of said plates having an annular flange within which the other of said plates is movable whereby a dampening effect on said lever system is obtained.

5. In a weighing scale of the class described, the combination with a load-supporting lever system including an equal-arm lever, of a null-reading meter for indicating the weight of the load and said lever system, and means, including a bridge circuit and, connected thereto, two capacitors each equidistant from the fulcrum point of said equal-arm lever, for electrically connecting said lever system to said null-reading meter, each of said capacitors comprising a stationary plate and a movable plate, said movable plate cooperating with said stationary plate and being fixed to and movable with said equal-arm lever to vary the capacitance of said capacitors, and one of said plates having an annular flange within which the other of said plates is movable whereby a dampening effect on said lever system is obtained.

References Cited in the file of this patent

UNITED STATES PATENTS

| 1,298,302 | Davis | Mar. 25, 1919 |
| 1,431,638 | Dowling | Oct. 10, 1922 |
| 1,685,789 | Thomas | Oct. 2, 1928 |
| 1,707,822 | Stock | Apr. 2, 1929 |
| 1,892,110 | Meredith | Dec. 27, 1932 |
| 2,001,836 | Craig | May 21, 1935 |
| 2,167,204 | Hadley | July 25, 1939 |
| 2,213,982 | Frey | Sept. 10, 1940 |
| 2,360,751 | Ziebolz | Oct. 17, 1944 |
| 2,371,040 | Fisher | Mar. 6, 1945 |
| 2,407,513 | Pounds | Sept. 10, 1946 |
| 2,419,217 | Isenberg | Apr. 22, 1947 |
| 2,475,684 | Weckerly | July 12, 1949 |
| 2,487,216 | Blau et al. | Nov. 8, 1949 |
| 2,597,899 | Payne | May 27, 1952 |
| 2,631,027 | Payne | Mar. 10, 1953 |
| 2,662,223 | Brewer | Dec. 8, 1953 |
| 2,666,262 | Ruge | Jan. 19, 1954 |
| 2,680,012 | Bozoian | June 1, 1954 |

FOREIGN PATENTS

| 515,733 | Great Britain | Dec. 13, 1939 |
| 256,266 | Switzerland | Aug. 15, 1948 |
| 258,737 | Switzerland | May 16, 1949 |
| 970,552 | France | June 21, 1950 |